United States Patent [19]
Genequand

[11] Patent Number: 6,115,167
[45] Date of Patent: Sep. 5, 2000

[54] OPTICAL ACTUATOR FOR DIRECTING AN INCIDENT LIGHT BEAM ONTO A FIXED SURFACE EXTERNAL TO THE ACTUATOR

[75] Inventor: Pierre-Marcel Genequand, Geneva, Switzerland

[73] Assignee: CSEM-Centre Suisse d'Electronique et de Microtechnique S.A., Neuchatel, Switzerland

[21] Appl. No.: 09/318,513

[22] Filed: May 25, 1999

[30]  Foreign Application Priority Data

May 25, 1998 [FR] France .................................. 98 06536

[51] Int. Cl.$^7$ ........................................................ G02B 26/08
[52] U.S. Cl. ........................... 359/224; 359/198; 359/199
[58] Field of Search ..................................... 359/196–199, 359/223, 224; 385/88, 90, 93

[56]  References Cited

U.S. PATENT DOCUMENTS 4,025,203  5/1977  Lee .......................................... 359/224

FOREIGN PATENT DOCUMENTS

8810960 U  10/1988  Germany .
WO9748001  12/1997  WIPO .

*Primary Examiner*—James Phan

[57]  ABSTRACT

An optical actuator directs an incident light beam from a light source onto a fixed surface external to the actuator at a variable angle. It directs the light beam onto a pupil in a predetermined region of space. A fixed base is attached to mobile supports which carry a mirror on the path of the beam. The supports are moved by a motor drive. The base and the supports are connected together by flexible blades aligned with two axes extending from the base toward a point of intersection. The mirror can therefore deflect the beam at a variable angle relative to the pupil.

8 Claims, 4 Drawing Sheets

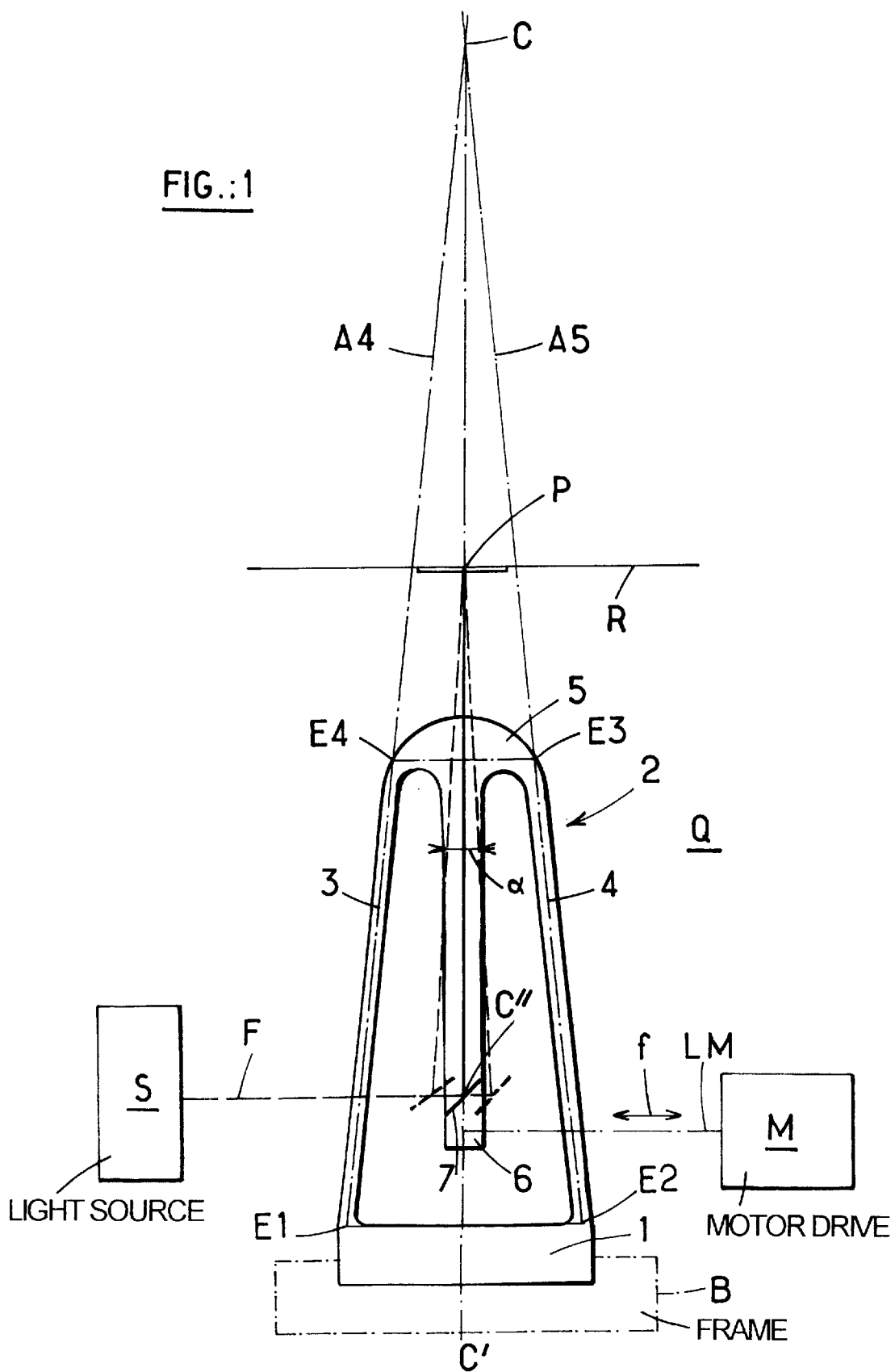
FIG.:1

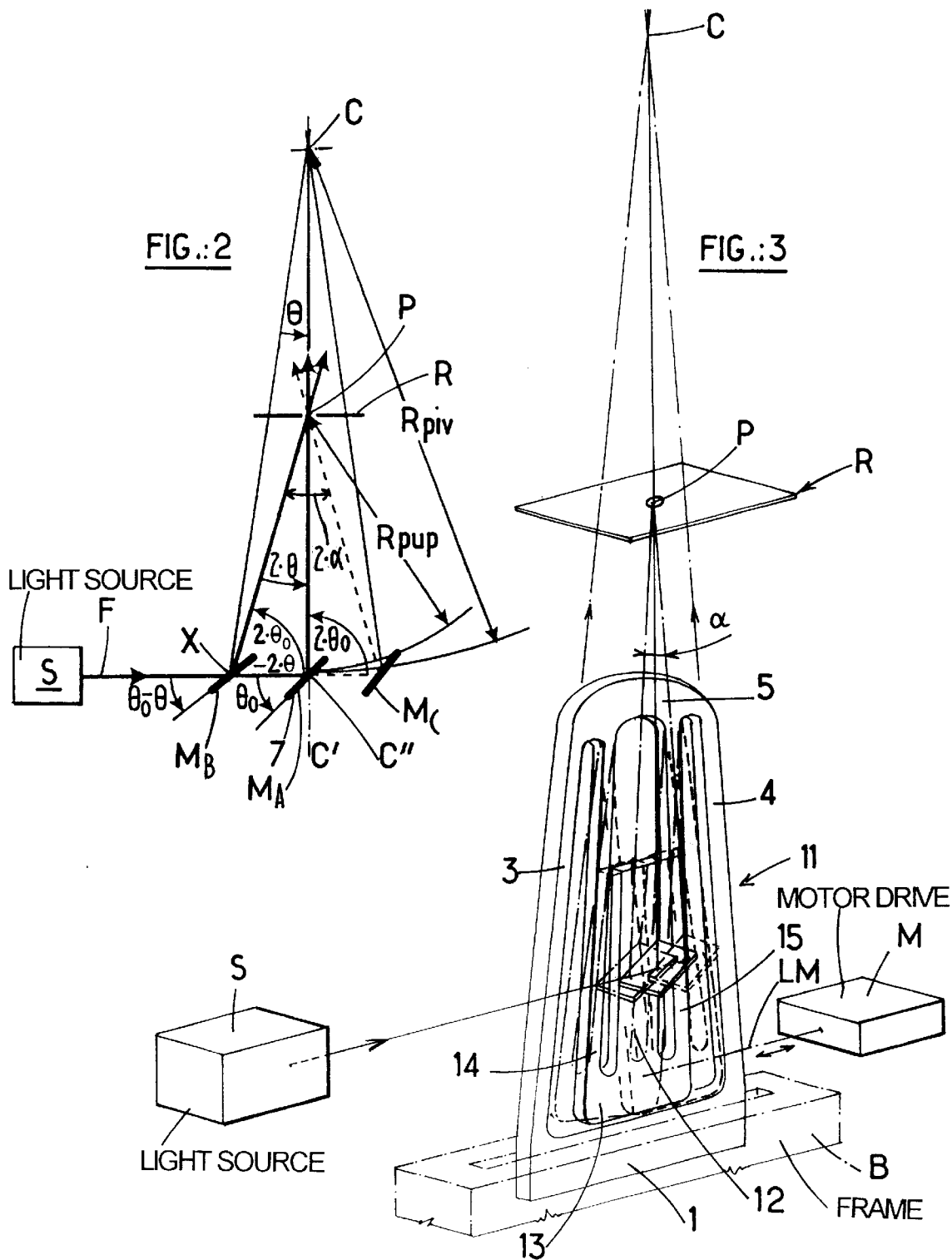

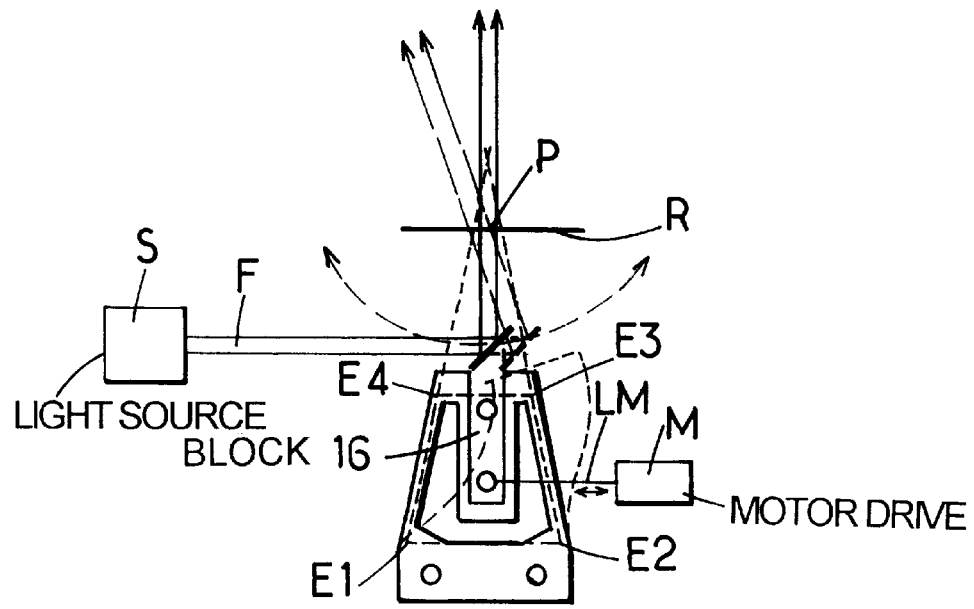
FIG.:4
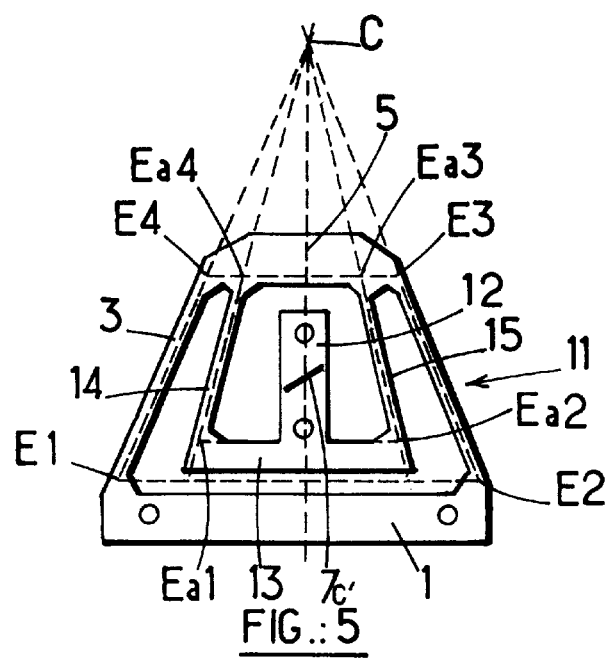
FIG.:5

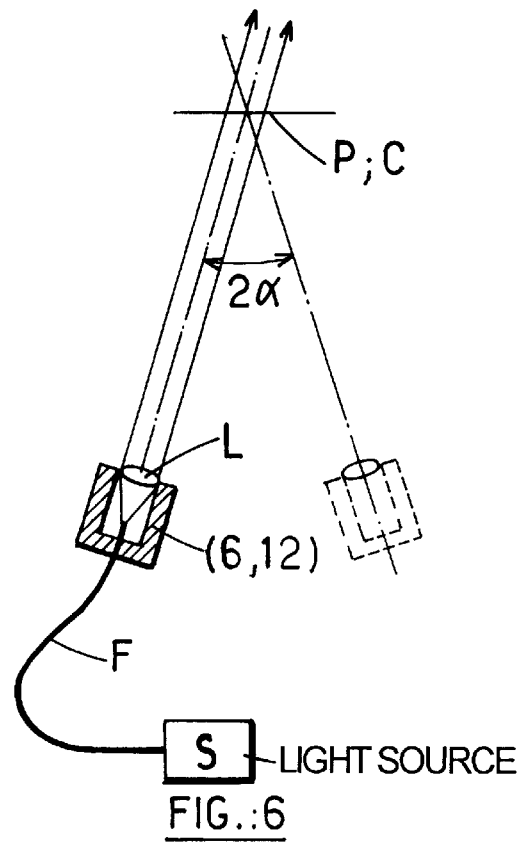
FIG.:6
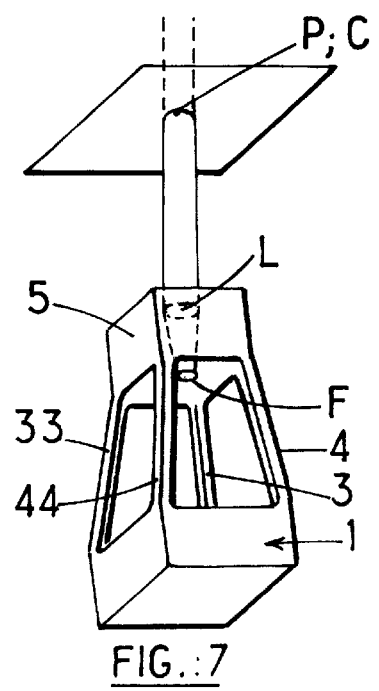
FIG.:7

OPTICAL ACTUATOR FOR DIRECTING AN INCIDENT LIGHT BEAM ONTO A FIXED SURFACE EXTERNAL TO THE ACTUATOR

BACKGROUND OF THE INVENTION

1. Field of the Invention

The present invention concerns an actuator for directing an incident light beam onto a fixed surface external to the actuator with a variable angle of incidence.

Without this being limiting on the invention in any way, an actuator of the above kind may be required in an analyzer including a cell containing a biochemical sample to be analyzed, for example. The measurement is performed by illuminating the sample through a fixed pupil with a beam that has to impinge on the sample at an angle that can be varied. In an analyzer of this kind the cell must be at a location that must not be encumbered with the means for producing and/or conveying the mobile beam. Also, it must be possible to manipulate the cell containing the sample without interacting with the device illuminating the sample.

2. Description of the Prior Art

Prior art devices for deflecting a light beam at an angle that can be varied are not suitable for the above application.

One well known example is an oscillating mirror onto which a light beam is directed and which reflects the beam at twice the angle at which it impinges on the mirror. The direction of the beam can be varied by pivoting the mirror about an axis in its own plane, possibly in a dynamically oscillating manner if the mirror moves continuously to and fro. However, in an arrangement of the above kind, the pupil through which the beam passes is necessarily on the mirror itself. Thus it cannot be applied to an analyzer as described above because the mirror would encumber the analysis cell and the sample could not be manipulated correctly.

An aim of the invention is to provide an actuator of the general kind indicated above which meets the two-fold requirement of being able to be placed at a location relatively far from the pupil through which the beam must pass and of not encumbering that location.

SUMMARY OF THE INVENTION

The invention therefore consists in an actuator adapted to direct a light beam from a light source at a variable angle of incidence onto a pupil in a predetermined region of space, said actuator comprising a fixed base, support means mounted to be mobile relative to said base, optical means for pointing said beam on the path thereof between said source and said pupil and carried by said support means, and motor drive means connected to said support means to move them in a controlled manner, wherein said base and said mobile support means are connected to each other by at least one pair of flexible blades forming with them a substantially plane mount defining a general plane, the flexible blades of said pair are respectively aligned with two axes extending from said base toward a point of intersection in said plane, said blades are connected to said support means at two respective points between said base and said point of intersection of said axes, and said pointing means are adapted to deflect said beam in a variable manner in a plane parallel to said plane of said mount by moving said support means.

By virtue of the above features of the invention, the pupil can be illuminated by the light beam at an angle that can be varied by operating on the support means and all of the actuator can be relatively far from the area in which the light beam causes its effect and therefore does not encumber that area.

The pair of blades advantageously defines with the base and the support means a quadrilateral in the general plane of the mount, which can easily be made from a material that is easy to cast, mold or machine. The quadrilateral can be a trapezium and in one particularly advantageous embodiment it is an isosceles trapezium.

One structure that has proved convenient to manufacture and to use comprises optical pointing means in the form of a mirror carried by the support means and oriented in a plane perpendicular to the general plane of the mount.

The support means can comprise a connecting portion connected between two ends of the blades with the mirror mounted on an appendix fastened to the connecting portion and extending between the blades toward the base.

In one particularly advantageous embodiment capable of producing a particularly large angle of illumination of the pupil combined with minimum overall dimensions, the blades form a pair of first blades and the actuator further comprises a pair of second flexible blades also in the plane of the mount and having axes passing through the point of intersection of the first flexible blades and the second blades are connected to the support means and extend therefrom toward the base where they are connected together by a mobile crossmember to which the optical pointing means and the motor drive means are fastened.

In another advantageous embodiment making the construction of the actuator in accordance with the invention particularly flexible, the optical pointing means comprise an optical waveguide such as an optical fiber one end of which is connected to the light source and the other end of which is fixed to the support means and aligned with a convergent lens and the other end of the optical waveguide and the lens define an optical axis in the plane of the mount so as to be aligned with the pupil.

The use of an optical waveguide to convey the light beam into the actuator also makes it possible to construct an actuator in which the pupil can be illuminated from points distributed over a portion of a sphere.

Accordingly, in another embodiment, the invention consists in an actuator adapted to direct a light beam from a light source at a variable angle of incidence onto a pupil in a predetermined region of space, said actuator comprising a fixed base, support means mounted to be mobile relative to said base, motor drive means connected to said support means to move them in a controlled manner, wherein said base and said mobile support means are connected to each other by four flexible blades respectively aligned with four axes extending from said base toward a point of intersection in said plane, said base and said mobile support means being connected together by four flexible blades respectively aligned with four axes on the edges of a pyramid on a square base at whose apex said pupil is located, said blades being connected to said support means at four respective points between said base and said summit of said pyramid, and optical pointing means comprising an optical waveguide such as an optical fiber one end of which is connected to said light source and the other end of which is fixed to said support means and aligned with a convergent lens, said other end of said waveguide and said lens defining an optical axis in the plane of said mount so as to be aligned with said pupil so that said pointing means can be moved over a portion of a sphere.

Other features and advantages of the invention will become apparent in the course of the following description which is given by way of example only and with reference to the accompanying drawings.

BRIEF DESCRIPTION OF THE DRAWINGS

FIG. 1 is a diagrammatic front view of a first embodiment of an actuator in accordance with the invention.

FIG. 2 is a diagram illustrating the design of the actuator from FIG. 1.

FIG. 3 is a perspective view of a different embodiment of the invention.

FIGS. 4 and 5 are simplified views of the structure of the mounts of the actuators shown in FIGS. 1 and 3, respectively.

FIG. 6 is a theoretical diagram of an embodiment in which the incident light beam comes from an optical fiber whose end is attached to the actuator.

FIG. 7 shows a variant of the invention in which the pointing means can be commanded in two perpendicular directions.

DETAILED DESCRIPTION OF THE PREFERRED EMBODIMENTS

The embodiment of the actuator in accordance with the invention shown diagrammatically in FIG. 1 is adapted to direct a light beam F from a light source S onto a region R in space, to be more precise onto a target pupil P in that region of space, for example. The actuator points the light beam F at the target pupil P with an angle of incidence $\alpha$ that can be varied, preferably continuously adjusted or dynamically varied. The figure shows only the central ray of the beam F impinging on the center point of the target pupil P.

To give a more concrete idea of the invention, in one particularly appropriate application of the invention, as shown in FIG. 1, a biochemical analysis cell is placed in the region R, the place where the analysis takes place being in the area corresponding to the target pupil P and the analysis requiring illumination by the beam F at an angle that must be variable or at least adjustable. In particular, a cell of the above kind can comprise a diffraction grating on which the biological sample to be analyzed is placed. The biochemical analysis cell is neither shown nor described here because it does not form part of the invention. The light source S can be a semiconductor laser, for example.

Note that the spatial attitude of the actuator in accordance with the invention is not decisive for its operation, the attitude shown in the figures being purely arbitrary.

The actuator comprises a base 1 which can be fastened to a larger frame B (symbolized in chain-dotted outline) on which all the components of the measuring device of which the actuator is part are mounted. Here it is assumed that the base is inserted into a slot in the frame B.

The base 1 is part of a mount 2 in the general form of an apertured plate whose general plane Q corresponds to the plane of the drawing in FIG. 1.

The mount 2 also includes a pair of flexible blades 3 and 4. These blades, which must be flexible in a direction in the plane Q and rigid in all other directions, preferably have a rectangular or square cross section and their longitudinal axes A4 and A5 are in the plane Q defined by the plate of the mount 2. The blades respectively extend from the base 1 so that their axes A4 and A5 intersect at a point C in space referred to hereinafter as the pivot center C.

The mount 2 also comprises a connecting portion 5 forming support means. In the embodiment shown, this connecting portion connects together the ends of the blades 3 and 4. Its shape is unimportant. In the example shown it has an arcuate outside edge.

The connecting portion 5 materializes support means in the sense that it has an appendix 6 on which a plane mirror 7 is mounted.

Thus the flexible blades 3 and 4, the base 1 and the connecting portion 5 can be deemed to define a quadrilateral whose apexes E1 to E4 are points on the axes of the flexible blades 3 and 4. Here, the blades are the same length and their axes are at the same angle to the sides of the quadrilateral respectively joining the apexes E1; E2 and E3; E4. The quadrilateral E1–E4 is therefore an isosceles trapezium having an axis of symmetry C-C'.

The appendix 6 extends between the blades 3 and 4 from the connecting portion 5 toward the base 1 and the plane mirror 7 is perpendicular to the plane Q of the mount 2. It is inclined at 45° to the axis of symmetry C-C' and has an optical center C''. The mirror 7 extends out of the general plane Q of the mount 2 (i.e. toward the observer in FIG. 1).

Also, the appendix 6 is fastened to a mechanical link LM symbolized by a dashed line in FIG. 1. The mechanical link LM is connected to a motor drive device M which can pull or push the appendix 6 and consequently move the mirror 7 in the direction of the arrow f. The link LM can be a rod or, which is preferable, the appendix 6 can include a metal plate associated with a magnetic circuit including an excitation coil and in whose airgap the plate may be moved by varying the current in the coil to move the appendix 6 in the direction of the arrow f. Other motor drive means can be used.

The material and the dimensions of the mount are chosen so that the blades 3 and 4 are highly rigid in a direction perpendicular to the plane Q but can deform easily, and possibly elastically, in the plane Q or parallel to that plane. This amounts to saying that traction or thrust applied to the appendix 6 by the motor drive device M in the direction of the arrow f moves the optical center C'' of the mirror 7 along a circle whose center is the pivot center C. Consequently, if the mirror is illuminated by the light source S, the light beam F impinges on the region R in the pupil P at an angle which can be varied and whose excursion can be equal to the angle $\alpha$. Like the center of the pupil P, the center ray of the beam is offset relative to the plane of the mount.

In the FIG. 1 embodiment, the mount is preferably molded or cast or possibly machined (using a laser or spark erosion, for example) in one piece from a plastics material or a metal. However, it is equally feasible for the mount to be constructed from four separate components (the base, the connecting portion and the two blades) and for hinges to be provided at the four corners E1 to E4 of the quadrilateral.

FIG. 2 is a theoretical demonstration of the behavior of the actuator as just described.

The incident beam F from the source S is represented by its center ray. The center C'' of the mirror on which the center ray from the source S impinges is at a distance $R_{piv}$ from the pivot center C on a virtual pivot axis perpendicular to the plane Q of FIG. 2.

In the intermediate position $M_A$ of the mirror 7, the center ray of the beam F impinges on the mirror at an angle $\theta_0$ of 45°, for example. Consequently, the mirror 7 reflects the incident ray at an angle $2\theta_0 = 90°$. It therefore illuminates the pupil P at an angle of 90° to the plane of the region R.

When the motor drive device M (FIG. 1) moves the mirror toward the position $M_B$ through an angle $-\theta$, equal to half the angle $\alpha$, for example, it is at an angle $\theta_0 - \theta$ to the incident ray. The emergent ray leaving the mirror is therefore at an angle $2\theta_0 - 2\theta$ to the incident ray.

If X is the point at which the center C'' of the mirror 7 is located in position $M_B$, the straight line segment drawn between the center C" in position $M_A$ and the point X is common to the two triangles respectively formed with, on the one hand, the straight line segments C"C and XC, the angle between which is the angle θ through which the mirror 7 has pivoted, and, on the other hand, the emergent rays respectively obtained for positions $M_A$ and $M_B$, the angle between these rays being $180°-(180°-2\theta_0+2\theta_0-2\theta)=2\theta$.

As a result, for small angles of pivoting of the mirror 7, regardless of its position, and for any position of the mirror 7 between positions $M_B$ and $M_C$, the emergent center rays all pass through a single point at a distance from the center of the mirror which is half the pivot radius C-C". It therefore suffices to make this point coincide with the center of the pupil P to obtain the desired effect.

FIG. 3 is a diagrammatic perspective view of the currently preferred form of actuator in accordance with the invention.

The actuator comprises a mount 11 that is also in the form of an apertured plate with a base 1, a connecting portion 5 and two flexible lateral blades 3 and 4, the whole having the general form of an isosceles trapezium.

However, and differing in this respect from the embodiment shown in FIG. 1, the mount 11 supports the mirror 7, not on an appendix attached directly to the connecting portion 5, but on an appendix 12 extending from a second connecting portion 13 in turn connected to the connecting portion 5 by a pair of second flexible lades 14 and 15.

The second flexible blades 14 and 15 are in the plane of the mount 11 and oriented so that the ends of their axes define a quadrilateral Ea1 to Ea4, the point of intersection of the axes coinciding with the point of intersection C of the axes of the first blades 3 and 4 (see FIG. 5 in particular). In this embodiment the two quadrilaterals E1 to E4 and Ea1 to Ea4 are isosceles triangles.

The theory of operation of this second embodiment of the invention is similar to that of the first embodiment. It has the advantage of allowing a greater angular travel of the mirror 7 and of reducing distortion due to deformation of the flexible blades 3, 4, 14 and 15.

In FIG. 3, the motive force of the motor drive device M is applied to the connecting portion 13.

FIGS. 4 and 5 are simplified representations of the structure of the actuators from FIGS. 1 and 3. FIG. 4 shows that the mirror 7 can be mounted on a support block 16 fixed to the appendix 6, and this arrangement can be used in the FIG. 5 variant. This structure enables the mirror 7 to be mounted above the mount 2 (or the mount 11) which can facilitate conveyance of the light beam F without encumbering the region R in which the pupil P is located.

FIG. 4 also shows, in a highly exaggerated manner and in dashed line, the deformation of the flexible blades when the motor drive means M are operated (in this instance toward the right).

The invention is not limited to the embodiments previously described. An optical waveguide, such as an optical fiber, associated with a convergent lens can be used to point the beam F (see FIG. 6). One end of the optical waveguide is connected to the light source S and its other end is mounted on the support means 6 or 12, aligned with the convergent lens L. The direction of the optical axis defined by this other end and the lens passes through the point of intersection C of the flexible blades. In this case, this point of intersection or center of rotation C of the pointing means corresponds to the center of the pupil P. FIG. 6 shows such pointing means diagrammatically, representing only the appendices 6, 12, a fiber F, a lens L, a light source S and the pupil P.

FIG. 7 shows another variant of the invention in the form of an actuator including a double mount formed of four flexible blades 3, 4, 33 and 44 oriented relative to each other along the edges of a truncated pyramid on a square base. This actuator allows the pointing device associated with an optical fiber 7 and a convergent lens L to be moved over a portion of a sphere. The pointing means can be associated with two motors (not shown) operating on the part 5 in two perpendicular directions. Once again, the center of rotation C of the pointing means coincides with the center of the pupil P.

There is claimed:

1. An actuator adapted to direct a light beam from a light source at a variable angle of incidence onto a pupil in a predetermined region of space, said actuator comprising a fixed base, support means mounted to be mobile relative to said base, optical means for pointing said beam on the path thereof between said source and said pupil and carried by said support means, and motor drive means connected to said support means to move them in a controlled manner, wherein said base and said mobile support means are connected to each other by at least one pair of flexible blades forming with them a substantially plane mount defining a general plane, the flexible blades of said pair are respectively aligned with two axes extending from said base toward a point of intersection in said plane, said blades are connected to said support means at two respective points between said base and said point of intersection of said axes, and said pointing means are adapted to deflect said beam in a variable manner in a plane parallel to said plane of said mount by moving said support means.

2. The actuator claimed in claim 1 wherein said pair of blades defines with said base and said support means a quadrilateral in said general plane of said mount.

3. The actuator claimed in claim 2 wherein said quadrilateral is a trapezium.

4. The actuator claimed in claim 3 wherein said trapezium is an isosceles trapezium.

5. The actuator claimed in claim 1 wherein said optical pointing means comprise a mirror mounted on said mount, carried by said support means and oriented in a plane perpendicular to said general plane of said mount.

6. The actuator claimed in claim 5 wherein said support means comprise a connecting portion connected between two ends of said blades and said mirror is mounted on an appendix fastened to said connecting portion and extending between said blades toward said base.

7. The actuator claimed in claim 1 wherein said blades form a pair of first blades and said actuator further comprises a pair of second flexible blades also in said plane of said mount and having axes passing through said point of intersection of said first flexible blades and said second blades are connected to said support means and extend therefrom toward said base where they are connected together by a mobile crossmember to which said optical pointing means and said motor drive means are fastened.

8. The actuator claimed in claim 1 wherein said optical pointing means comprise an optical waveguide such as an optical fiber one end of which is connected to said light source and the other end of which is fixed to said support means and aligned with a convergent lens and said other end of said optical waveguide and said lens define an optical axis in said plane of said mount so as to be aligned with said pupil.

* * * * *